(12) United States Patent
Tao

(10) Patent No.: US 10,213,071 B2
(45) Date of Patent: Feb. 26, 2019

(54) FOLDABLE CHAIR FRAME ADAPTED FOR BEDPAN

(71) Applicants: Guomin Tao, Shenzhen, Guangdong (CN); Guojian Zhang, Shenzhen, Guangdong (CN)

(72) Inventor: Guomin Tao, Guangdong (CN)

(73) Assignees: Guomin Tao, Shenzhen (CN); Guojian Zhang, Shenzhen (CN)

( * ) Notice: Subject to any disclaimer, the term of this patent is extended or adjusted under 35 U.S.C. 154(b) by 184 days.

(21) Appl. No.: 15/369,818

(22) Filed: Dec. 5, 2016

(65) Prior Publication Data
US 2018/0153361 A1   Jun. 7, 2018

(51) Int. Cl.
| | |
|---|---|
| A47K 13/00 | (2006.01) |
| A47C 4/10 | (2006.01) |
| A61G 5/10 | (2006.01) |
| A47K 17/02 | (2006.01) |
| F16H 21/44 | (2006.01) |

(52) U.S. Cl.
CPC .............. *A47K 13/005* (2013.01); *A47C 4/10* (2013.01); *A47K 17/02* (2013.01); *A61G 5/1002* (2013.01); *F16H 21/44* (2013.01)

(58) Field of Classification Search
CPC ...... A47K 13/10; A47K 13/005; A47K 13/24; A47K 17/02; A47K 11/04; A47C 3/0257; A47C 4/10; A47C 4/18; A47C 15/004; A61G 7/02; A61G 5/1002; A61G 1/017
See application file for complete search history.

(56) References Cited

U.S. PATENT DOCUMENTS

| | | | | | |
|---|---|---|---|---|---|
| 1,672,437 | A | * | 6/1928 | Vance | A47C 3/029 297/32 |
| 2,136,838 | A | * | 11/1938 | Bosschieter | A47C 4/10 297/39 |
| 2,749,972 | A | * | 6/1956 | Markkula | A47D 1/02 297/49 |
| 3,215,469 | A | * | 11/1965 | Wamsley | A47C 1/035 108/135 |
| 3,671,072 | A | * | 6/1972 | Holt | A47C 3/029 297/32 |

(Continued)

FOREIGN PATENT DOCUMENTS

| | | | | |
|---|---|---|---|---|
| CA | 2379201 | A1 * | 1/2001 | ............. A47K 11/04 |
| CN | 2737339 | Y | 11/2005 | |

(Continued)

*Primary Examiner* — Timothy J Brindley

(57) ABSTRACT

Disclosed is a foldable chair frame adapted for a bedpan, comprising: a fixed base; a seat plate, a center of which forms a defecation hole; a support assembly, two ends of which are hinged to the fixed base and the seat plate, respectively, the support assembly comprising a front support assembly and a rear support assembly; a driving device provided for driving the support assembly to rotate and/or driving the seat plate to move up and down, the driving device being connected to the front support assembly or the rear support assembly, or being connected between the fixed base and one of the seat plate, the front support assembly and the rear support assembly. The present invention can provide aid to the patients or the disabled person lying in bed all day to use the bedpan. It also can be folded for easy and convenient storage when not in use.

7 Claims, 3 Drawing Sheets

(56) References Cited

U.S. PATENT DOCUMENTS

| | | | | |
|---|---|---|---|---|
| 6,009,571 A * | 1/2000 | Battiston | ............... | A47K 11/04 4/479 |
| 2004/0227331 A1 * | 11/2004 | Chen | .................... | A61G 5/006 280/650 |
| 2014/0208493 A1 * | 7/2014 | Ahmed | ................. | A61G 7/053 4/237 |
| 2015/0082526 A1 * | 3/2015 | Grudzinski | ............ | A47K 11/04 4/239 |
| 2015/0328069 A1 * | 11/2015 | Staggs | ................ | A61G 5/1037 4/604 |
| 2016/0287038 A1 * | 10/2016 | Nelson | ................ | A47K 13/005 |
| 2017/0086594 A1 * | 3/2017 | Khandrika | ............ | A47C 7/506 |
| 2017/0095381 A1 * | 4/2017 | Griffith | ................. | A61G 5/006 |
| 2017/0216116 A1 * | 8/2017 | Lai | ........................... | A61G 7/02 |
| 2017/0347845 A1 * | 12/2017 | Duarte | ................... | A47K 13/28 |
| 2018/0008100 A1 * | 1/2018 | McCaffery | ............ | A47C 31/11 |

FOREIGN PATENT DOCUMENTS

| | | | | |
|---|---|---|---|---|
| DE | 9210365 U1 * | 2/1993 | ............ | A47K 11/04 |
| DE | 9315895 U1 * | 3/1994 | ............ | A47K 11/04 |
| WO | WO-2013167822 A1 * | 11/2013 | ......... | A47C 1/03294 |

* cited by examiner

FOLDABLE CHAIR FRAME ADAPTED FOR BEDPAN

FIELD OF THE INVENTION

The present invention relates to a foldable supporting mechanism, and more particularly to a foldable chair frame adapted for a bedpan, which provides aid to the patients or the disabled persons lying in bed all day to use the bedpan.

BACKGROUND OF THE INVENTION

At present, the patients, who cannot move freely, and the disabled person lying in bed all day generally use a bedpan to replace the toilet for convenience. However, it is uncomfortable when sitting on the bedpan directly, and it is inconvenient to clean the bum after using the bedpan and the sheet gets dirty easily.

SUMMARY OF THE INVENTION

The technical problem to be solved is to overcome the above defects of the prior art by providing a foldable chair frame adapted for a bedpan, which can provides aid to the patients or the disabled persons lying in bed all day to use the bedpan.

To solve the above problem, there are provided following technical solutions:

A foldable chair frame adapted for a bedpan includes: a fixed base; a seat plate, a center of which forms a defecation hole; a support assembly, two ends of which is hinged to the fixed base and the seat plate, respectively, the support assembly including a front support assembly and a rear support assembly; a driving device provided for driving the support assembly to rotate and/or provided for driving the seat plate to move up and down, the driving device being connected to the front support assembly or the rear support assembly, or being connected between the fixed base and one of the seat plate, the front support assembly and the rear support assembly. Wherein the fixed base, the seat plate, the front support assembly and the rear support assembly are all attached together to form a foldable space structure; when the support assembly is rotated to a horizontal position, the foldable space structure is folded, and when the support assembly is rotated to a preset angle, the foldable space structure is unfolded, the seat plate being parallel to the fixed base; and the foldable chair frame further includes a first fixing assembly provided for enabling the foldable space structure to remains in an unfolded state.

Preferably, the driving device is a motor which is provided with a speed reducer, the speed reducer being provided with an output shaft and being connected to a revolving shaft of the front support assembly or the rear support assembly; or, a torque connecting part is provided on an external end of the revolving shaft of the front support assembly or the rear support assembly, the driving device further including a hand-driven boosting rod connected to the torque connecting part; or, the driving device is a linear actuating unit, which is provided between the fixed base and one of the seat plate, the front support assembly and the rear support assembly, and the linear actuating unit is a reducing motor, an air cylinder, an oil cylinder or a ball screw transmission mechanism; or, the driving device includes an air bag provided between the fixed base and the seat plate and an air pump connected to the air bag; or, the driving device is a magnetic force mechanism provided between the fixed base and the seat plate, the magnetic force mechanism including a lower coil fixed on the fixed base, an upper coil fixed below the seat plate, and a driving circuit electrically connected to the upper coil and the lower coil; and a magnetic field produced by the upper coil has a same polarity as that produced by the lower coil produce, so that a repulsive force is produced to lift the seat plate.

Preferably, the driving device includes a driving wheel for supporting the support assembly, a transmission shaft connected to the fixed base and a fixing rod for installing the driving wheel; an inner end of the fixing rod is fixed to the transmission shaft; the fixed base is provided with a mounting hole, which is provided between the front support assembly and the rear support assembly for installing the transmission shaft; the driving wheel is rotatably connected to an external end of the fixing rod; and the support assembly is driven by the driving wheel to be rotated to a vertical position when the transmission shaft rotates.

Preferably, the fixed base is further provided with a resisting element at a front side of the front support assembly for preventing a forward rotation of the front support assembly.

Preferably, the driving device further includes a motor which is provided with a speed reducer, the speed reducer being provided with an output shaft and being connected to the transmission shaft; or a torque connecting part is provided on an external end of the transmission shaft, the driving device further including a hand-driven boosting rod connected to the torque connecting part.

Preferably, the first fixing assembly includes: a first fixing end fixed to the rear support assembly, a first chain having a front end connected to the first fixing end, and a first connecting end fixed to the first chain, the first connecting end being firmly mounted in a first connecting hole which is provided on the fixed base; or, the first fixing assembly includes: a flexible chain having a front end fixed to the fixed base and a pin fixed to a rear end of the chain; the fixed base is provided with a pin hole located at a side of the front support assembly; and the pin is detachably inserted into the pin hole so as to prevent a backward rotation of the front support assembly.

Preferably, the foldable chair frame further includes a backrest, which includes a frame rod hinged to the seat plate and a support frame hinged to an inner side of the frame rod.

Preferably, the foldable chair frame further includes a second fixing assembly for preventing a backward rotation of the backrest, the second fixing assembly including a second fixing end fixed to the backrest, a second chain having a front end connected to the second fixing end, and a second connecting end fixed to the second chain, the second connecting end being firmly mounted in a second connecting hole which is provided on the seat plate.

Preferably, the front support assembly includes a left-front supporting rod and a right-front supporting rod, both of which have a same structure; the rear support assembly includes a left-rear supporting rod and a right-rear supporting rod, both of which have a same structure; and the seat plate is further provided with positioning plates arranged below and around the defecation hole.

Preferably, the driving device includes a double-linkage mechanism, which is connected between the front support assembly and the fixed base, or between the rear support assembly and the fixed base, and a driving source for driving the double-linkage mechanism; the double-linkage mechanism includes a rocking bar having a lower end hinged to the fixed base and a transmission rod connected to an upper end of the rocking bar, the transmission rod having an upper end hinged to the front support assembly or rear support assembly; a transmission shaft, provided on an lower end of the rocking bar, is hinged to the fixed base; the driving source is a motor provided with a speed reducer; and the speed reducer is provided with an output shaft and is connected to the transmission shaft; or, a torque connecting part is provided on an external end of the transmission shaft, the driving device further including a hand-driven boosting rod connected to the torque connecting part.

Compared with the prior art, the present invention has following beneficial effects: the foldable chair frame adapted for a bedpan according to the present invention includes a fixed base hinged with a front support assembly and a rear support assembly, and a seat plate also hinged with the front support assembly and the rear support assembly so as to constitute a foldable space structure. And the seat plate is provided with a defecation hole and several positioning plates arranged below and around the defecation hole, thus a bedpan can be placed under the defecation hole for the patients to use easily. The seat plate is further hinged with a backrest to improve comfort and convenience for the usage. Both of the support assembly and the backrest are provided with corresponding fixing elements to prevent the support assembly and the backrest from rotating backwards, thereby forming a stationary structure when the patients use the present invention. When the chair frame is not in use, the first fixing assembly can be switched to a not in use state so that the chair frame can be folded for easy storage. The chair frame has low overall height when it is folded, thus the patient just needs to lean to one side and then the folded chair frame can be placed behind the patient with the help of others, and the patient just needs to turn around and then the patient can lie on the folded chair frame finally. The seat plate can be lifted under the driving of the driving device and then the bedpan can be placed under the defecation hole for patients to use and it is convenient to clean the body of the patient and prevents the sheet from getting dirty.

Furthermore, the output shaft of the front support assembly or rear support assembly is connected with the motor, which is provided to control the support assembly to rotate thereby forming a space structure.

Furthermore, the external end of the front support assembly or rear support assembly is provided with torque connecting part, and the driving device is a hand-driven boosting rod connected to the torque connecting part, thus the support assembly can be rotated to form a space structure by using the hand-driven boosting rod to rotate the torque connecting part.

Furthermore, the driving device is a linear actuating unit, which is provided between the fixed base and one of the seat plate, the front support assembly and the rear support assembly for controlling the seat plate to move up and down.

Furthermore, the driving device includes an air bag provided between the fixed base and the seat plate and an air pump connected to the air bag. The seat plate can be moved up and down by inflating the air bag.

Furthermore, the driving device is a magnetic force mechanism provided between the fixed base and the seat plate. The magnetic field produced by the upper coil has a same polarity as that produced by the lower coil produce, so that a repulsive force is produced to lift the seat plate.

Furthermore, the support assembly is driven by the driving wheel to be rotated to a vertical position when the transmission shaft rotates, thereby forming a space structure.

Furthermore, the fixed base is further provided with a resisting element at a front side of the front support assembly for preventing a forward rotation of the front support assembly, based on this, the support assembly will not rotate frontwards when the patient moves on the chair frame.

Furthermore, the drive could be a motor provided with a speed reducer for controlling the driving wheel to drive the support assembly to rotate; and the driving device also could be a combination of a hand-driven boosting rod and a torque connecting part, thereby the driving wheel can be driven to rotate by using the hand-driven boosting rod.

Furthermore, the fixed base, the first chain and the rear support assembly forms a triangle structure together. Based on this, the rear support assembly will not rotate downwards when a person sits on the chair frame, thereby avoiding falling caused by the folding of the chair frame.

Furthermore, the foldable chair frame further includes a backrest for improving comfort of the usage.

Furthermore, the backrest is provided with second fixing assembly having a same structure as that of the first fixing assembly. The second chain, the backrest and the seat plate forms a triangle structure together. Based on this, the rear support assembly will not rotate downwards when a person lies on the chair frame.

DESCRIPTION OF THE REFERENCE NUMBER IN THE FIGURES

Figure 1:
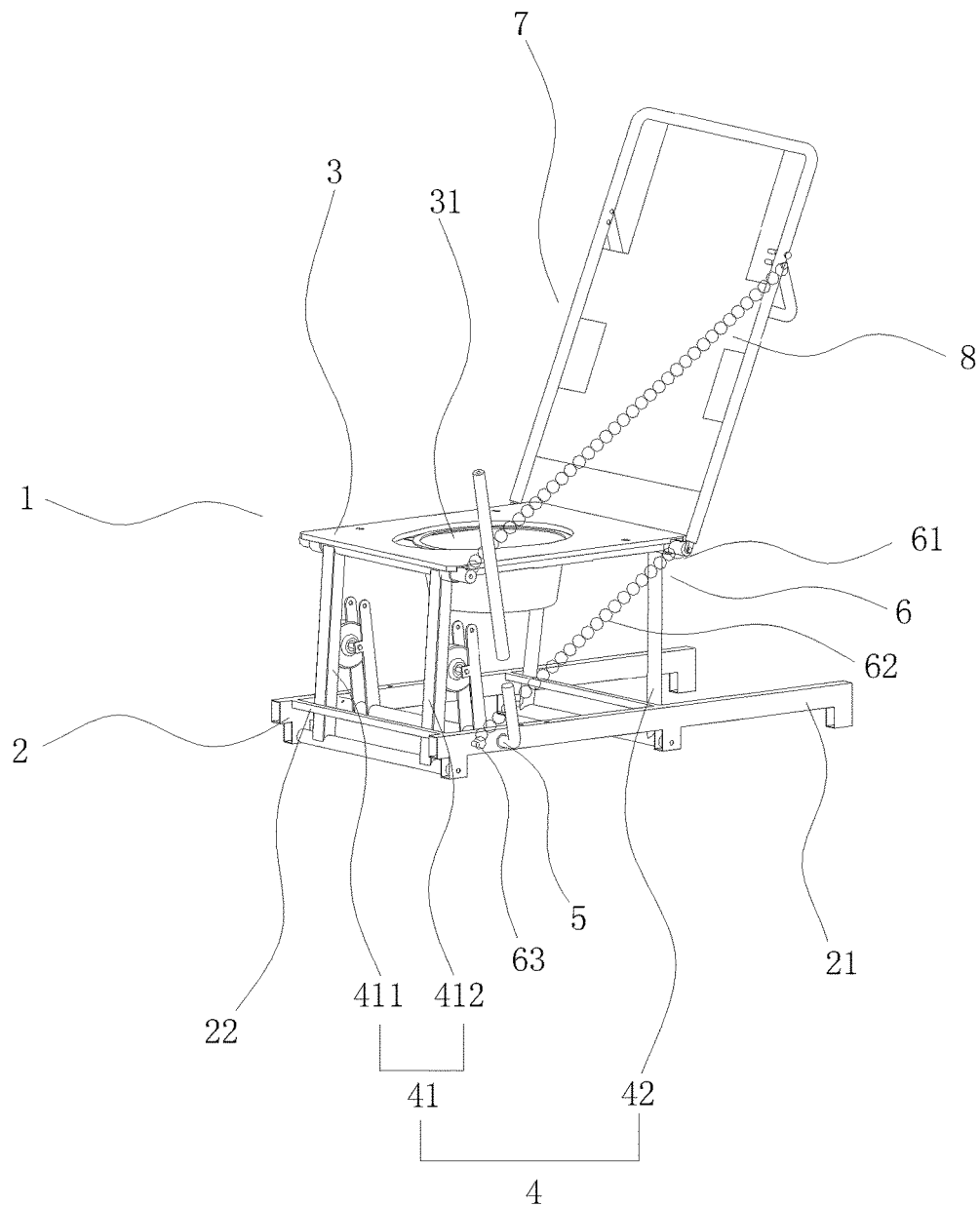
FIG. 1 is a perspective view of the foldable chair frame adapted for a bedpan according to a preferred embodiment of the present invention.

Foldable chair frame 1; fixed base 2; transverse supporting rod 21; resisting element 22; seat plate 3; defecation hole 31; positioning plate 32; support assembly 4; front support assembly 41; left-front supporting rod 411; right-front support rod 412; rear support assembly 42; driving device 5; driving wheel 51; transmission shaft 52; torque connecting part 521; fixing rod 53; hand-driven boosting rod 54; first fixing assembly 6; first fixing end 61; first chain 62; first connecting end 63; backrest 7; frame rod 71; support frame 711; soft cloth 72; second fixing assembly 8; second fixing end 81; second chain 82; second connecting end 83; bedpan 9.

DETAILED DESCRIPTION OF ILLUSTRATED EMBODIMENTS

For understanding the technical content of the present invention more sufficiently, some embodiments of the present invention will be described as follows, by way of example only, with reference to the accompanying drawings.

Referring to FIG. 1, the foldable chair frame 1 adapted for a bedpan includes a fixed base 2, a seat plate 3, a support assembly 4, one end of which is hinged to the fixed base 2 and the other end of which is hinged to the seat plate 3, a driving device 5 provided for driving the support assembly 4 to rotate, a first fixing assembly 6 provided for preventing the support assembly 4 from rotating downwards, a backrest 7 hinged to the seat plate 3 or rear support assembly 42, and a second fixing assembly 8 provided for fixing the backrest 7.

The support assembly 4 includes a front support assembly 41 and a rear support assembly 42. The front support assembly 41 includes a left-front supporting rod 411 and a right-front supporting rod 412, both of which have the same structure. The rear support assembly 42 includes a left-rear supporting rod (not shown in the figures) and a right-rear supporting rod (not shown in the figures), both of which have a same structure. Two ends of each supporting rod are hinged to the seat plate 3 and the fixed base 2, respectively, thereby constituting a foldable space structure. The foldable space structure is folded when the support assembly is rotated to a horizontal position; and the foldable space structure is unfolded and the seat plate is parallel to the fixed base when the support assembly is rotated to a preset angle.

The fixed base is a frame structure, which includes a transverse supporting rod 21 and a resisting element 22 provided at a front side of the front support assembly 41 for preventing a forward rotation of the front support assembly 41. The transverse supporting rod 21 extends backwards so as to avoid rollover when a person lies on the chair frame 1. The resisting element 22 is provided to prevent the support assembly 4 from rotating over 90 degrees. When the first fixing assembly 6 is removed, the chair frame will be folded under the action of the gravity of the person on the chair frame; furthermore, the movement of the person sitting on the chair frame will not cause the support assembly to rotate forwards, thereby improving safety performance thereof.

The seat plate is provided with a defecation hole formed on a center thereof and several positioning plates arranged below and around the defecation hole (referring to FIG. 2).

The first fixing assembly 6, used for enabling the foldable space structure to remains in an unfolded state, includes a first fixing end 61 fixed to the rear support assembly 42, a first chain 62 having a front end connected to the first fixing end 61, and a first connecting end 63 fixed to the first chain 62. The fixed base 2 is provided with a first connecting hole (not shown in the figures) and the first connecting end 63 is firmly mounted in the first connecting hole. The first chain 62, the rear support assembly 42 and the fixed base 2 form a triangle structure together. The first connecting end 63 can be inserted into the first connecting hole (not shown in the figures) when the foldable space structure is formed. When a person sits or lies on the foldable chair frame, the front support assembly 41 will not continue to rotate forwards under pressure; meanwhile, the first chain 62 will be straightened so that a steady triangle structure is formed; and then the front support assembly 41 is unable to rotate downwards due to the restriction of the first fixing assembly 6, thus the foldable space structure becomes a stationary structure.

Figure 2:
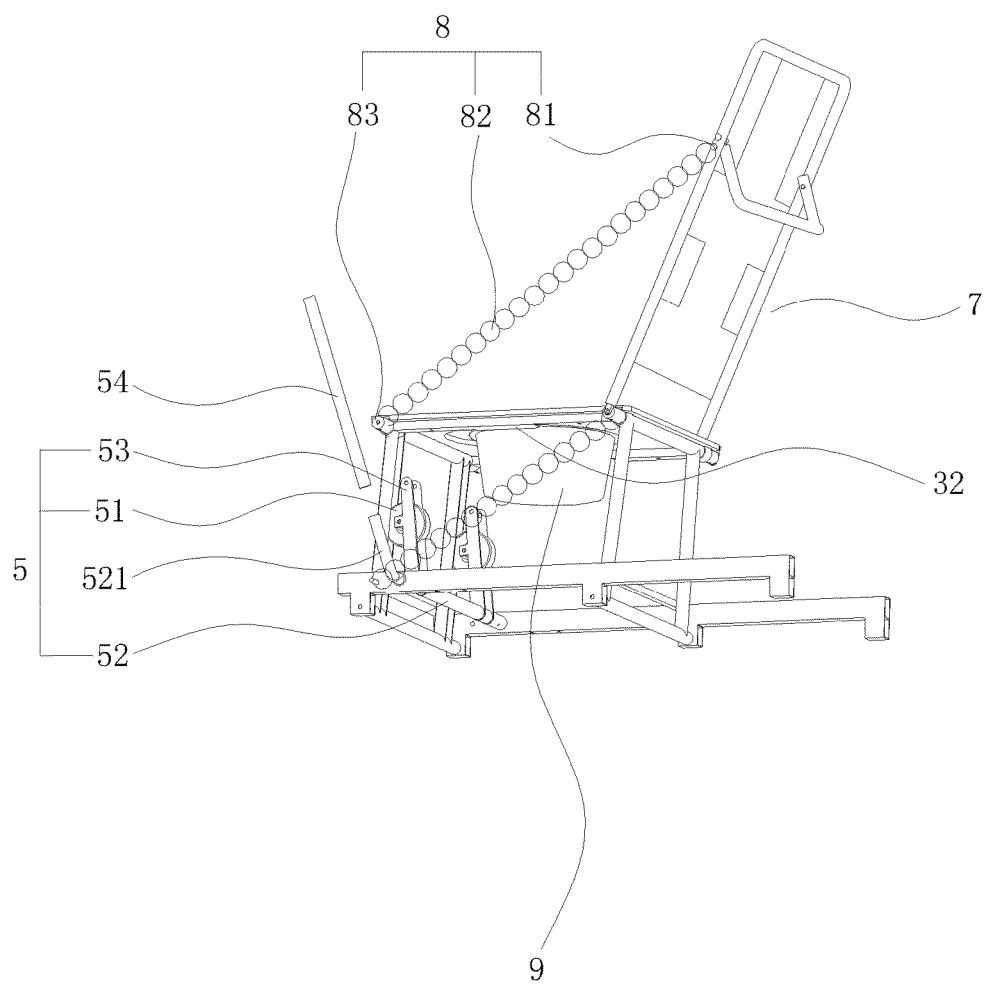
FIG. 2 is another perspective view of the foldable chair frame adapted for a bedpan shown in FIG. 1.

As shown in FIG. 2, the driving device 5 includes a driving wheel 51 for supporting the support assembly 4, a transmission shaft 52 connected to the fixed base 2, a fixing rod 53 for installing the driving wheel 51 and a hand-driven boosting rod 54. The driving wheel 51 is rotatably connected to the fixing rod 53, and the fixing rod 53 is fixed to the transmission shaft 52. The fixed base 2 is provided with a mounting hole (not shown in the figures), which is provided between the front support assembly 41 and the rear support assembly 42 for installing the transmission shaft 52. An end of the transmission shaft 52 is provided with a torque connecting part 521, which is able to be inserted into an end of the hand-driven boosting rod 54. The foldable space structure is unfolded when the torque connecting part 521 is driven to rotate by the hand-driven boosting rod 54, and then the transmission shaft 52 rotates and the support assembly 4 is driven by the driving wheel 51 to be rotated to a vertical position.

The second fixing assembly 8, provided for preventing a backward rotation of the backrest 7, includes a second fixing end 81 fixed to the backrest 7, a second chain 82 having a front end connected to the second fixing end 81, and a second connecting end 83 fixed to the second chain 83. The seat plate 3 is provided with a second connecting hole (not shown in the figures), and the second connecting end 83 is firmly mounted in the second connecting hole (not shown in the figures). The second fixing assembly 8 can prevent the downward rotation of the backrest 7 according to the same principle as that of the first fixing assembly 6. Thus, the backrest 7 will not rotate when a person leans on the backrest 7.

Referring to FIG. 1 and FIG. 2, the seat plate 3 is provided with several positioning plates 32 arranged below and around the defecation hole 31. A bedpan 9 can be disposed under the seat plate 3 and aligned with the defecation hole 31 by means of the support of the positioning plates 32.

Figure 3:
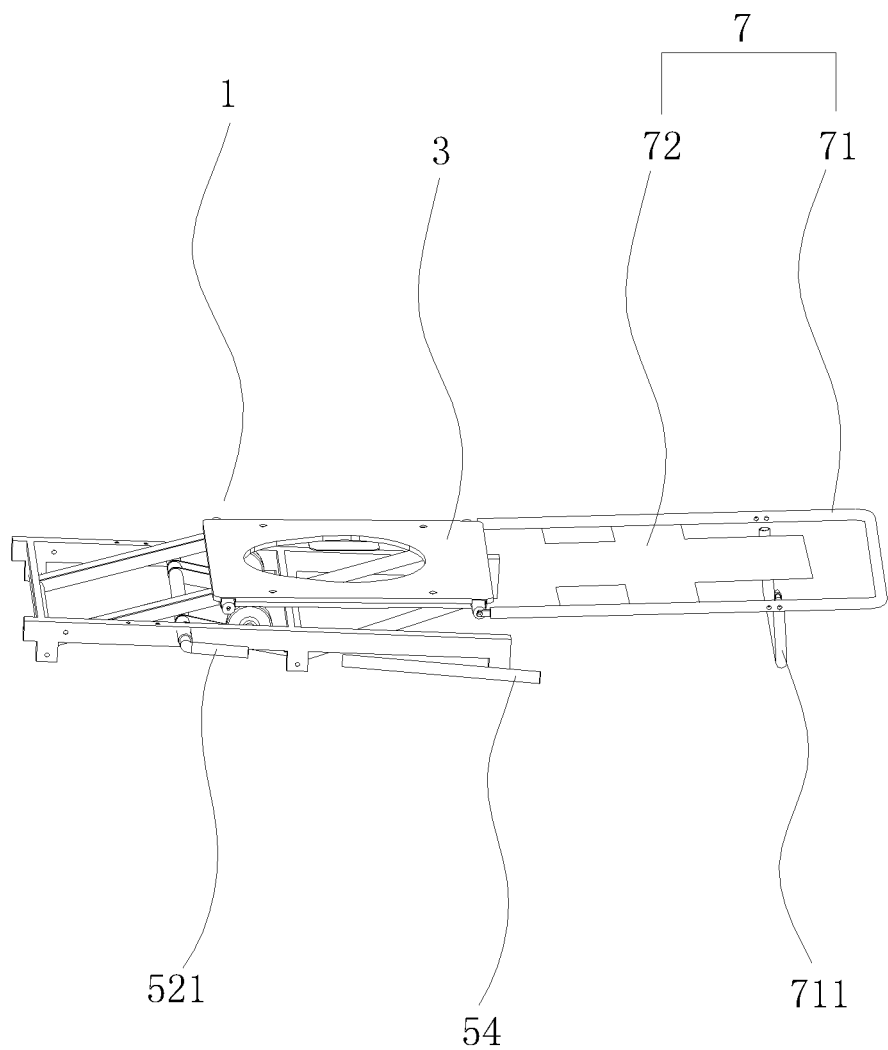
FIG. 3 is a perspective view illustrating the foldable chair frame adapted for a bedpan shown in FIG. 1 in a folded state.

As shown in FIG. 3, the backrest 7 includes a frame rod 71 hinged to the seat plate 3 and a soft cloth 72 fixed to the frame rod 71. A support frame 711 is provided at the back side of the frame rod 71. When the patient wants to use a bedpan, he/she needs to lean to one side and then the folded chair frame 1 can be placed behind the patient with the help of others, and the patient just needs to turn around and then the patient will lie on the folded chair frame 1. After that, with the help of others, the backrest 7 is rotated and the second connecting end (referring to FIG. 2) is firmly inserted into the second connecting hole (referring to FIG. 2), and then the torque connecting part 521 is rotated, by means of using the hand-driven boosting rod 54, to make the space structure be formed, and the first connecting end (referring to FIG. 1) is firmly inserted into the first connecting hole (referring to FIG. 1), and finally the bedpan (referring to FIG. 2) is placed under the defecation hole 31 (referring to FIG. 2) for the use of the patient. After the patient finishing, the bedpan (referring to FIG. 2) is moved away from the chair frame and other people can clean the bum of the patient via the defecation hole (referring to FIG. 1).

When the chair frame 1 is needed to be folded, carry out the above steps in reverse order.

The soft cloth 72 provided on the frame rod 71 is able to forming a recess according to the head shape of the patient, thereby improving comfort for the product usage.

In other embodiments, the driving device is a motor which is provided with a speed reducer, the speed reducer being provided with an output shaft and being connected to a revolving shaft of the front support assembly or the rear support assembly; or, a torque connecting part is provided on an external end of the revolving shaft of the front support assembly or the rear support assembly, the driving device further including a hand-driven boosting rod connected to the torque connecting part.

In other embodiments, the driving device further includes a motor which is provided with a speed reducer, the speed reducer being provided with an output shaft and being connected to the transmission shaft; or, a torque connecting part is provided on an external end of the transmission shaft, the driving device further including a hand-driven boosting rod connected to the torque connecting part.

In other embodiments, the driving device includes a double-linkage mechanism, which is connected between the front support assembly and the fixed base, or between the rear support assembly and the fixed base, and a driving source for driving the double-linkage mechanism; the double-linkage mechanism includes a rocking bar having a lower end hinged to the fixed base and a transmission rod connected to an upper end of the rocking bar, the transmission rod having an upper end hinged to the front support assembly or rear support assembly; a transmission shaft, provided on an lower end of the rocking bar, is hinged to the fixed base; the driving source is a motor provided with a speed reducer; and the speed reducer is provided with an output shaft and is connected to the transmission shaft; or, a torque connecting part is provided on an external end of the transmission shaft, the driving device further including a hand-driven boosting rod connected to the torque connecting part.

In other embodiments, the first fixing assembly includes: a flexible chain having a front end fixed to the fixed base and a pin fixed to a rear end of the chain; the fixed base is provided with a pin hole located at a side of the front support assembly; and the pin is detachably inserted into the pin hole so as to prevent a backward rotation of the front support assembly.

In other embodiments, both of two sides of the foldable chair frame have first fixing assembly and second fixing assembly.

In other embodiments, the driving device is a linear actuating unit, which is provided between the fixed base and one of the seat plate, the front support assembly and the rear support assembly, and the linear actuating unit is a reducing motor, an air cylinder, an oil cylinder or a ball screw transmission mechanism.

In other embodiments, the driving device includes an air bag provided between the fixed base and the seat plate and an air pump connected to the air bag.

In other embodiments, the driving device is a magnetic force mechanism provided between the fixed base and the seat plate, the magnetic force mechanism including a lower coil fixed on the fixed base, an upper coil fixed below the seat plate, and a driving circuit electrically connected to the upper coil and the lower coil; and a magnetic field produced by the upper coil has a same polarity as that produced by the lower coil produce, so that a repulsive force is produced to lift the seat plate.

In conclusion, the present invention provides a seat plate to be hinged with a front support assembly and a rear support assembly so as to constitute a foldable space structure, the seat plate is provided with a defecation hole and several positioning plates arranged below and around the defecation hole, thus a bedpan can be placed under the defecation hole for the patients to use easily; the seat plate is further hinged with a backrest to improve comfort and convenience for the usage. Both of the support assembly and the backrest are provided with corresponding fixing elements to prevent the support assembly and the backrest from rotating backwards, thereby forming a stationary structure when the patients use the present invention.

Above descriptions of embodiments are provided for further illustrating the technical content of the present invention, so as to facilitate understanding and it should be understood that the invention is not to be limited to the disclosed embodiments. Any technique extension and recreation according to the present invention should be included within the scope of protection of the invention.

What is claimed is:

1. A foldable chair frame adapted for a bedpan, comprising:
   a fixed base;
   a seat plate, a center of which forms a defecation hole;
   a support assembly, two ends of which are hinged to the fixed base and the seat plate, respectively, the support assembly comprising a front support assembly and a rear support assembly;
   a driving device provided for driving the support assembly to rotate and/or provided for driving the seat plate to move up and down, the driving device being connected to the front support assembly or the rear support assembly, or being connected between the fixed base and one of the seat plate, the front support assembly and the rear support assembly;
   wherein the fixed base, the seat plate, the front support assembly and the rear support assembly are all attached together to form a foldable space structure; the foldable space structure is folded when the support assembly is rotated to a horizontal position; the foldable space structure is unfolded and the seat plate is parallel to the fixed base when the support assembly is rotated to a preset angle; and the foldable chair frame further comprises a first fixing assembly provided for enabling the foldable space structure to remains in an unfolded state;
   wherein the driving device comprises a driving wheel for supporting the support assembly, a transmission shaft connected to the fixed base and a fixing rod for installing the driving wheel; an inner end of the fixing rod is fixed to the transmission shaft; the fixed base is provided with a mounting hole, which is provided between the front support assembly and the rear support assembly for installing the transmission shaft; the driving wheel is rotatably connected to an external end of the fixing rod; and the support assembly is driven by the driving wheel to be rotated to a vertical position when the transmission shaft rotates.

2. The foldable chair frame adapted for a bedpan according to claim 1, wherein the fixed base is further provided with a resisting element at a front side of the front support assembly for preventing a forward rotation of the front support assembly.

3. The foldable chair frame adapted for a bedpan according to claim 1, wherein the driving device further comprises a motor which is provided with a speed reducer, the speed reducer being provided with an output shaft and being connected to the transmission shaft;
   or,
   a torque connecting part is provided on an external end of the transmission shaft, the driving device further comprises a hand-driven boosting rod connected to the torque connecting part.

4. The foldable chair frame adapted for a bedpan according to of claim 1, wherein the first fixing assembly comprises: a first fixing end fixed to the rear support assembly, a first chain having a front end connected to the first fixing end, and a first connecting end fixed to the first chain, the first connecting end being firmly mounted in a first connecting hole which is provided on the fixed base;
   or,
   the first fixing assembly comprises: a flexible chain having a front end fixed to the fixed base and a pin fixed to a rear end of the chain; the fixed base is provided with a pin hole located at a side of the front support assembly; and the pin is detachably inserted into the pin hole so as to prevent a backward rotation of the front support assembly.

5. The foldable chair frame adapted for a bedpan according to of claim 1, wherein the foldable chair frame further comprises a backrest, which comprises a frame rod hinged to the seat plate and a support frame hinged to an inner side of the frame rod.

6. The foldable chair frame adapted for a bedpan according to of claim 5, wherein the foldable chair frame further comprises a second fixing assembly for preventing a backward rotation of the backrest, the second fixing assembly comprising a second fixing end fixed to the backrest, a second chain having a front end connected to the second fixing end, and a second connecting end fixed to the second chain, the second connecting end being firmly mounted in a second connecting hole which is provided on the seat plate.

7. The foldable chair frame adapted for a bedpan according to of claim 1, wherein the front support assembly comprises a left-front supporting rod and a right-front supporting rod, both of which have a same structure; the rear support assembly comprises a left-rear supporting rod and a right-rear supporting rod, both of which have a same structure; and the seat plate is further provided with positioning plates arranged below and around the defecation hole.

* * * * *